(12) United States Patent
Ko et al.

(10) Patent No.: US 11,560,063 B2
(45) Date of Patent: Jan. 24, 2023

(54) CHARGING CONNECTOR CONTROL SYSTEM AND METHOD

(71) Applicants: HYUNDAI MOTOR COMPANY, Seoul (KR); Kia Motors Corporation, Seoul (KR)

(72) Inventors: Kyu-Beom Ko, Incheon (KR); Ik-Jun Choi, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 510 days.

(21) Appl. No.: 16/685,146

(22) Filed: Nov. 15, 2019

(65) Prior Publication Data

US 2020/0189408 A1  Jun. 18, 2020

(30) Foreign Application Priority Data

Dec. 12, 2018 (KR) .......................... 10-2018-0159945

(51) Int. Cl.
*B60L 53/16* (2019.01)
*H01R 13/639* (2006.01)

(52) U.S. Cl.
CPC ............ *B60L 53/16* (2019.02); *H01R 13/639* (2013.01)

(58) Field of Classification Search
CPC ............................... B60L 53/16; H01R 13/639
USPC ........................................................... 320/107
See application file for complete search history.

(56) References Cited

U.S. PATENT DOCUMENTS

| 6,150,940 | A | * | 11/2000 | Chapman | G08B 13/14 340/687 |
| 9,318,908 | B2 | * | 4/2016 | Chang | H02J 7/0047 |
| 9,368,008 | B2 | * | 6/2016 | Jefferies | G08B 13/1418 |
| 9,827,950 | B2 | * | 11/2017 | Lovett | E05B 81/56 |
| 2013/0320920 | A1 | * | 12/2013 | Jefferies | G08B 13/1418 320/109 |
| 2014/0049214 | A1 | * | 2/2014 | Chang | G08B 13/1427 320/109 |
| 2018/0316136 | A1 | * | 11/2018 | Cho | H01R 13/639 |
| 2020/0247261 | A1 | * | 8/2020 | Kojima | H02J 7/00034 |

FOREIGN PATENT DOCUMENTS

| CN | 201218963 | Y | * | 4/2009 | |
| CN | 107284256 | A | * | 10/2017 | |
| CN | 111806272 | A | * | 10/2020 | ............ B60L 53/16 |
| CN | 112727256 | A | * | 4/2021 | ............ B60L 53/16 |
| CN | 113147488 | A | * | 7/2021 | |
| DE | 102019131477 | A1 | * | 6/2020 | ............ B60L 53/14 |
| KR | 10-2012-0103092 | A | | 9/2012 | |
| KR | 10-2018-0121039 | A | | 11/2018 | |
| WO | WO-2004002771 | A1 | * | 1/2004 | ............ B60L 1/00 |
| WO | WO-2014068380 | A2 | * | 5/2014 | ............ B60L 1/006 |

* cited by examiner

*Primary Examiner* — Suresh Memula
(74) *Attorney, Agent, or Firm* — Fox Rothschild LLP (57) ABSTRACT

A charging connector control system may include a charging control unit of a charging equipment for supplying a control signal for charging; and a vehicle control unit for changing a sensing control signal to a normal control signal by executing a variable resistor control according to whether the sensing control signal, which is generated by sensing the control signal transmitted through a charging connector for connecting the charging equipment and a vehicle, is normal.

20 Claims, 6 Drawing Sheets

CHARGING CONNECTOR CONTROL SYSTEM AND METHOD

CROSS-REFERENCE TO RELATED APPLICATION

This application claims priority to Korean Patent Application No. 10-2018-0159945 filed on Dec. 12, 2018, which is incorporated herein by reference in its entirety.

BACKGROUND OF THE DISCLOSURE

Field of the Disclosure

The present disclosure relates to a charging control technique, and more particularly, to a system and a method for controlling the charging of a vehicle and the locking of a charging connector after charging.

Description of Related Art

Generally, a method for locking a charging connector for a vehicle installs the key corresponding to a Lock mode, an Auto mode, and an Unlock mode inside the vehicle, and therefore, sets and manages it.

However, in the case of the above-described Auto mode, when the charging is completed, the locking of a charger can be released to remove the charger. In addition, in the case of the Lock mode, it is always kept in a locked state even when the charging is completed, such that the charger is still attached to the vehicle.

In this case, there occurs a problem in that when a user does not set a mode according to the situation, the user's charger is stolen in the Auto mode, or other users other than the user who is in use even when it has been fully charged in the Lock mode does not use it.

Meanwhile, a method for realizing the locking function of the charging connector through a method for selecting and managing the corresponding functions (reservation setting/smart grid setting/charging connector locking control setting, etc.) in the vehicle is disclosed. The smart grid setting is controlled by navigation, and the charging connector locking control is controlled by various methods such as hard key/cluster setting/navigation setting. However, when the user does not set the corresponding method, it can cause the theft of the charging connector or the inconvenience to other users.

In addition, there is a problem in that in using a Vehicle to Grid (V2G) power grid through the smart grid, a separate navigation setting is required to perform the corresponding function.

The contents described in Description of Related Art are to help the understanding of the background of the present disclosure, and can include what is not previously known to those skilled in the art to which the present disclosure pertains.

SUMMARY OF THE DISCLOSURE

Aspects of the present disclosure may provide a charging connector control system and method, which may allow the user to prevent theft of the charging connector or avoid causing inconvenience to other users when a user does not set or properly set a charging connector locking control.

Aspects of the present disclosure may provide a charging connector control system and method, which can directly control the use of a smart grid as soon as a user connects a connector.

Aspects of the present disclosure may provide a charging connector control system, which may allow the user to prevent theft of the charging connector or avoid causing inconvenience to other users even when a user does not set or properly set a charging connector locking control.

A charging connector control system may include a charging control unit of a charging equipment for supplying a control signal for charging; and a vehicle control unit for changing a sensing control signal to a normal control signal by executing a variable resistor control according to whether the sensing control signal, which is generated by sensing the control signal transmitted through a charging connector for connecting the charging equipment and a vehicle, is normal.

The control signal may be changed through a first variable resistor.

A control mode corresponding to the resistance value of the first variable resistor may be predetermined, and the control mode may be one of an Auto mode that executes the locking of the charging connector only during charging, and a Lock mode that executes the locking of the charging connector regardless of charging.

When the first variable resistor does not operate within a predetermined time, the Auto mode may be executed by changing the resistance value.

A third variable resistor and a second variable resistor may be connected in parallel with each other at the vehicle side for a variable resistor control.

The first variable resistor and the third variable resistor may be connected in series by the charging connector.

A switch for connecting or disconnecting the second variable resistor may be disposed between the third variable resistor and the second variable resistor.

The charging control unit may generate and transmit a charging start signal when confirming the normal connection state therebetween.

Another embodiment of the present disclosure provides a charging connector control system including a vehicle control unit; and a charging control unit of a charging equipment for supplying a control signal for charging to the vehicle control unit through a charging connector, and changing the control signal to a normal control signal by controlling a variable resistor disposed in the charging connector to transmit it to the vehicle control unit.

The vehicle control unit may perform charging by using an Auto mode, and lock the charging connector only during charging and unlocks it after charging.

Yet another embodiment of the present disclosure provides a charging connector control system including a charging control unit of a charging equipment for supplying a control signal for charging; and a vehicle control unit for changing the control signal to a normal control signal according to the connection or the removal of a charging connector for connecting the charging equipment and a vehicle, and the charging connector has a different resistance value for each type.

The vehicle control unit may output the guide information for guiding a change to another charging connector when it does not match with a pre-stored resistance value with respect to the charging connector.

Yet another embodiment of the present disclosure provides a charging connector control method including supplying a control signal for charging by a charging control unit of a charging equipment; determining, by a vehicle control unit, whether a sensing control signal, which is generated by sensing the control signal transmitted through a charging connector for connecting the charging equipment and a vehicle, is normal; and changing, by the vehicle control unit, the sensing control signal to a normal control signal by executing a variable resistor control according to the determined result.

According to the present disclosure, it may be possible to prevent theft of the charging connector or avoid causing inconvenience to other users due to the user not setting the charging connector locking control properly.

Additionally or alternatively, it may be possible to directly control the use of the smart grid as soon as the user connects the connector.

DESCRIPTION OF SPECIFIC EMBODIMENTS

Various modifications and various embodiments can be made in accordance with the present disclosure, so that specific embodiments are illustrated in the drawings and described in detail in the specification. It should be understood, however, that it is not intended to limit the present disclosure to the particular disclosed forms, but includes all modifications, equivalents, and alternatives falling within the sprit and technical scope of the present disclosure.

Like reference numerals are used for like elements in describing each drawing. The terms "first," "second," and the like can be used to illustrate different components, but the components should not be limited by the terms. The terms are used to differentiate one element from another.

For example, a first component can be referred to as a second component, and similarly, the second component can also be referred to as the first component without departing from the scope of the present disclosure. The terms "and/or" includes combination of a plurality of related listed items or any of a plurality of related listed items.

Unless otherwise defined, all terms including technical and scientific terms used herein have the same meaning as commonly understood by one of ordinary skill in the art to which the present disclosure belongs.

It will be further understood that terms, such as those defined in commonly used dictionaries, should be additionally interpreted as having a meaning that is consistent with their meaning in the context of the relevant art, and will not be interpreted in an idealized or overly formal sense unless expressly so defined in the application.

Hereinafter, a charging connector control system and method according to an embodiment of the present disclosure will be described in detail with reference to the accompanying drawings.

In general, when describing a basic slow charging sequence of a vehicle, a charging equipment may send a voltage of 12V to a Control Pilot CP. Therefore, when the charging equipment is connected to the vehicle, the resistor (not illustrated) of the charging equipment and the resistor (not illustrated) of the vehicle are connected in series, and the CP drops to 9V. Based on this, the charging equipment and the vehicle confirm the connection state therebetween.

When the connection state between the charging equipment and the vehicle has been confirmed and the user's payment has been completed, the charging equipment transmits a charging progress signal (+12~−12V) to the vehicle side. This ratio is referred to as a CP duty and is used to calculate the intensity of a chargeable current, and based on this, the vehicle requests a current from the charging equipment.

When the charging progress signal is outputted, the vehicle connects a switch (not illustrated) and the CP voltage drops to 6V, and when a 6V+ the charging progress signal (Pulse Width Modulation (PWM)) condition has been completed, the charging starts.

Figure 1A:
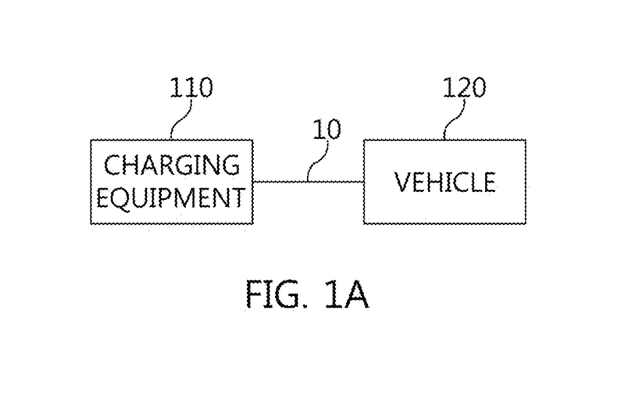
FIG. 1A is a conceptual diagram of connecting a charging equipment and a vehicle by a charging connector according to an embodiment of the present disclosure.
Figure 1B:
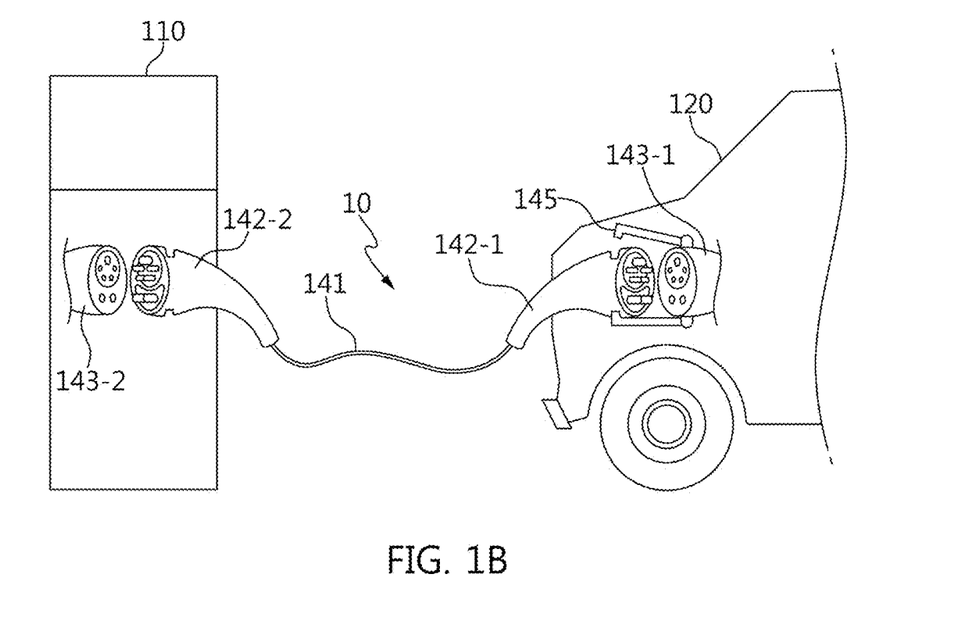
FIG. 1B is a conceptual diagram illustrating a general charging connector locking device.

FIG. 1A is a conceptual diagram of connecting a charging equipment 110 and a vehicle 120 by a charging connector 10 according to an embodiment of the present disclosure, and FIG. 1B is a conceptual diagram illustrating a general charging connector locking device. Referring to FIGS. 1A and 1B, the charging equipment 110 can be an Electric Vehicle Supply Equipment (EVSE).

The vehicle 120 can be a general Electric Vehicle (EV) that acquires power by using only electric energy, a Hybrid Electric Vehicle (HEV) that acquires power by using both the thermal energy according to the combustion of fossil fuel and the electric energy, a Plug-in Hybrid Electric Vehicle (PHEV) that uses both the thermal energy according to the combustion of fossil fuel and the electric energy and receives the electric energy from the outside to be chargeable in an embedded battery, a Fuel Cell Electric Vehicle (FCEV), etc.

The charging connector 10 is connected to a vehicle-side inlet 143-1 and/or a charging equipment-side inlet 143-2. The charging connector 10 can also be for public or common use as described above, but can also be private. Therefore, the charging connector 10 is composed of first and second plugs 142-1, 142-2 having a plurality of pins configured at both ends of the charging connector 10, and a high-voltage cable 141 integrally formed with the first and second plugs 142-1, 142-2. For example, the first plug 142-1 is fastened to the vehicle-side inlet 143-1, and the second plug 142-2 is fastened to the charging equipment-side inlet 143-2.

The charging connector 10 is connected to a power supply circuit of the charging equipment 110 through the high-voltage cable 141. In addition, a locking device 145 for locking the plugs 142-1, 142-2 is configured therein. The locking device 145 controls an actuator (not illustrated) so that the latch of the vehicle-side inlet 143-1 is inserted into a latch groove provided in the plug 142-1 to be locked. Generally, the actuator is composed of a motor, ball screws rotated by the motor, and a gear engaged with the ball screw, etc.

FIG. 1B is a diagram illustrating the locking concept for understanding, and various methods are possible. For example, the locking device can also be configured in the charging equipment 110, and the locking can also be performed with software.

The plug can be configured only at one end of the high-voltage cable, and the inlet coupled to the plug can be configured at the vehicle side or the charging equipment side.

Figure 2:
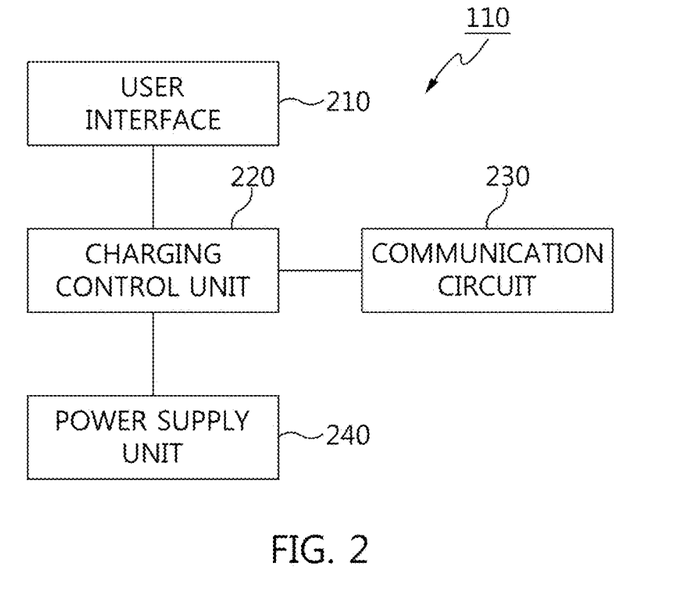
FIG. 2 is a block diagram illustrating a detailed configuration of the charging equipment illustrated in FIG. 1.

FIG. 2 is a block diagram of a detailed configuration of the charging equipment 110 illustrated in FIG. 1. Referring to FIG. 2, the charging equipment 110 supplies electric energy to the vehicle 120 so that the battery (not illustrated) of the vehicle 120 can be charged. For example, as illustrated in FIG. 2, the charging equipment 110 can be configured to include a user interface 210, a charging control unit 220, a communication circuit 230, a power supply unit 240, etc.

The user interface 210 receives a user command, or outputs information. Therefore, the user interface 210 can be a Liquid Crystal Display (LCD), a Light Emitting Diode (LED) display, a Plasma Display Panel (PDP), an Organic LED (OLED) display, a touch screen, a Cathode Ray Tube (CRT), a flexible display, a microphone, a keyboard, a button, etc. and a combination thereof.

The charging control unit 220 exchanges a signal with the components, and controls the charging. For this purpose, the charging control unit 220 can be composed of a microprocessor, a memory, etc.

The communication circuit 230 communicates with the vehicle 120 through the charging connector 10. For example, the communication circuit 230 uses the Power Line Communication (PLC) communication with the vehicle. For this purpose, the communication circuit 230 can be composed of a modem, a Digital Signal Processor (DSP), etc.

The power supply unit 240 is connected to the charging connector 10 to supply power to the vehicle 120. For this purpose, the power supply unit 240 can be composed of a regulator, a switch element, an inverter, etc. In addition, if necessary, the power supply unit 240 can further include various parts or equipment necessary for charging the vehicle 120, such as a transmission line or a transformer connected to an external power source other than these.

Figure 3:
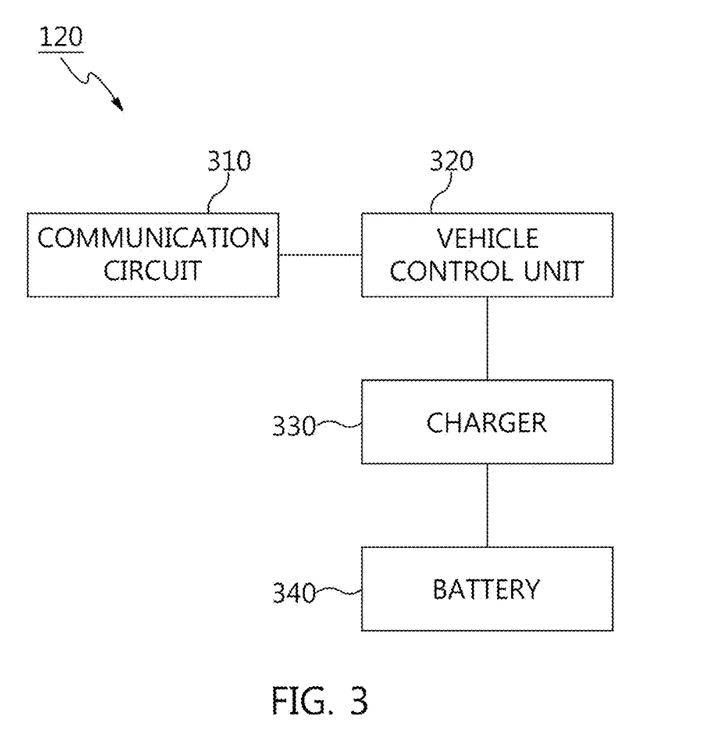
FIG. 3 is a block diagram illustrating a detailed configuration of a vehicle illustrated in FIG. 1.

FIG. 3 is a block diagram of a detailed configuration of the vehicle 120 illustrated in FIG. 1. Referring to FIG. 3, the vehicle 120 can be composed of a communication circuit 310, a vehicle control unit 320, a charger 330, a battery 340, etc.

The communication circuit 310 is connected to the charging equipment 110 side communication circuit 230 through the charging connector 10 to communicate therewith. For this purpose, the communication circuit 310 can be composed of a modem, a DSP, etc.

The vehicle control unit 320 exchanges a signal with the components, and controls the charging. For this purpose, the vehicle control unit 320 can be composed of a microprocessor, a memory, etc.

The charger 330 converts the power received from the charging equipment 110 to charge the battery 340. The charger 330 can be an On Board Charger (OBC). The On Board Charger (OBC) can be a bidirectional OBC. Therefore, a Vehicle to Grid (V2G) is possible. For example, it is possible to charge the vehicle 120 through the grid, and then transmit the remaining electricity after traveling back to the power grid.

The battery 340 has a battery cell (not illustrated) configured in series and/or in parallel, and this battery cell can be a high voltage battery for an electric vehicle such as a nickel metal battery cell, a lithium ion battery cell, a lithium polymer battery cell, and an all-solid battery cell, etc. Generally, the high-voltage battery is a battery used as a power source for moving an electric vehicle and refers to a high voltage of 100V or more. However, it is not limited thereto, and a low-voltage battery is also possible.

Figure 4:
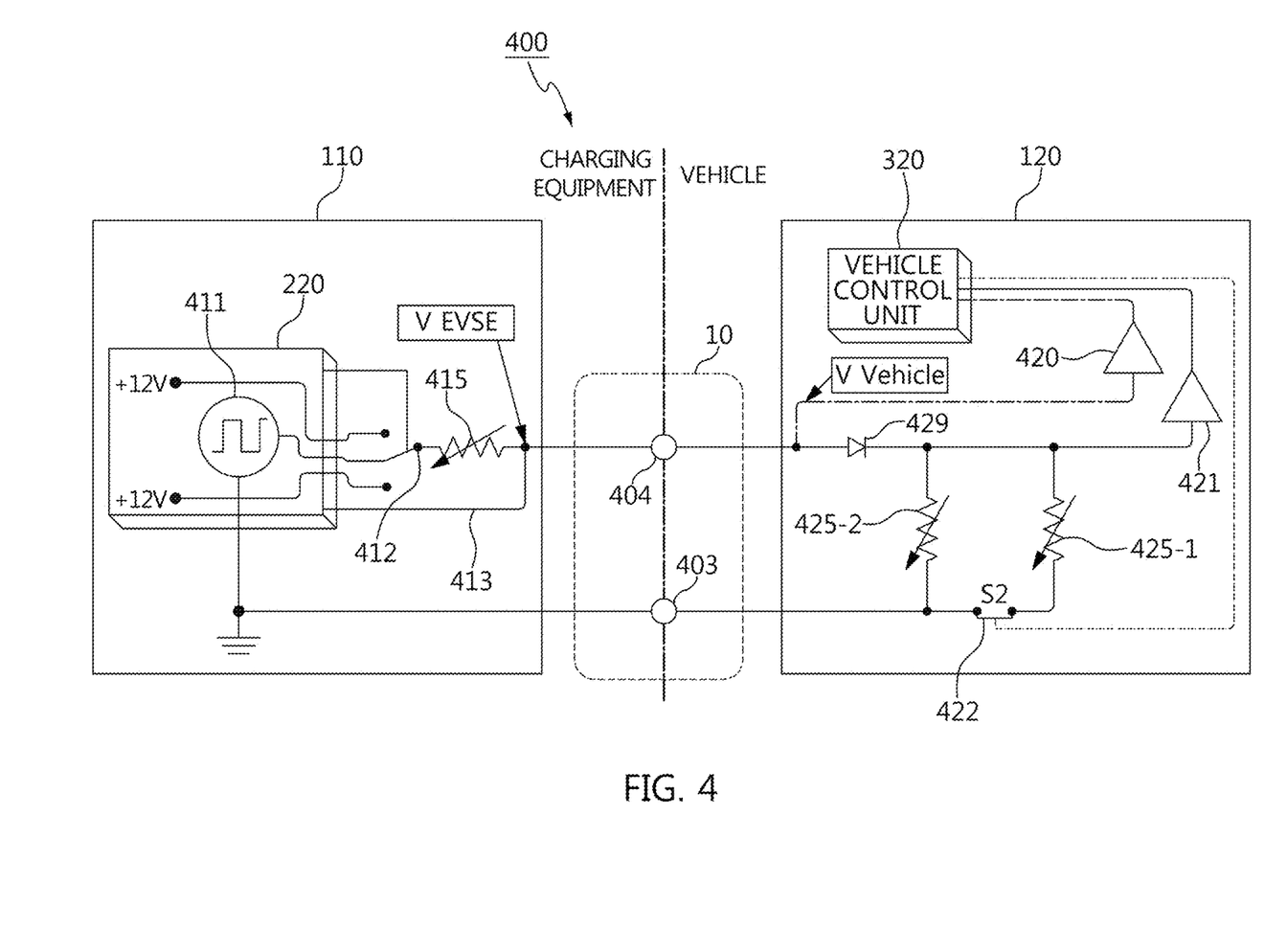
FIG. 4 is a circuit block diagram of a charging connector control system illustrated in FIG. 1.

FIG. 4 is a circuit block diagram of a charging connector control system 400 illustrated in FIG. 1. Referring to FIG. 4, in order to avoid safety problems, the vehicle 120 may need to keep the charging connector 10 in a locked state during charging. In addition, the charging connector 10 can also be a public one for common use, but can also be private, such that a condition for locking/unlocking the charging connector 10 after charging has been completed can be different in different situations.

Therefore, in order to solve these and other issues, an AUTO mode and a LOCK mode can be used to prevent theft and/or charging connector monopoly through hard key/cluster setting/navigation setting. The AUTO mode is a mode that activates the connector locking only during charging, and the LOCK mode is a mode that activates the connector locking regardless of charging.

However, in the case of such a method, a problem can occur according to the user setting. For example, in the case that the charging connector 10 is a public connector for common use, when the Lock mode is set, a next user cannot use the corresponding charging equipment 110.

Therefore, the charging equipment 110 side (e.g., left side of FIG. 4) controls by changing it into various values, and the vehicle 120 side (e.g., right side of FIG. 4) controls by recognizing these various values. For this purpose, the charging equipment 110 can be composed of a first switch 412 for selectively connecting a control signal 12V or a charging start signal, a first variable resistor 415 connected in series with the first switch 412, etc.

In addition, the charging equipment 110 side can be configured to include a measuring circuit 413 connected to the rear end of the first variable resistor 415 and configured to sense the control signal, an oscillator 411 for generating the charging start signal for starting charging, etc.

The charging control unit 220 generates the charging start signal when the charging equipment 110 and the vehicle 120 confirm the normal connection state therebetween by the charging connector 10 through the signal sensed through the measuring circuit 413. The charging start signal can be a Pulse Width Modulation (PWM) signal.

Meanwhile, the charging connector 10 is composed of a plurality of electric wires. Some of the plurality of electric lines can be used to transmit a signal (e.g., 403 and 404), and some of the plurality of electric lines can be used to transmit power.

Meanwhile, the vehicle 120 side is configured to include a third variable resistor 425-2 connected in series with the first variable resistor 415, a second variable resistor 425-1 connected in parallel with the third variable resistor 425-2, and a switch 422 for connecting or disconnecting the second variable resistor 425-1 between the third variable resistor 425-2 and the second variable resistor 425-1.

In addition, the vehicle 120 side is configured to include a first buffer circuit 420 for measuring a voltage at the front end of the third variable resistor 425-2, a second buffer circuit 421 connected to the front end of the second variable resistor 425-1 by a branch and for measuring a frequency and/or a power source, etc. These buffer circuits 420, 421 perform the amplification function even without affecting the measurement point.

In addition, a positive diode 429 is configured at the front end of the third variable resistor 425-2. This prevents power from flowing in the reverse direction thereof.

Figure 5:
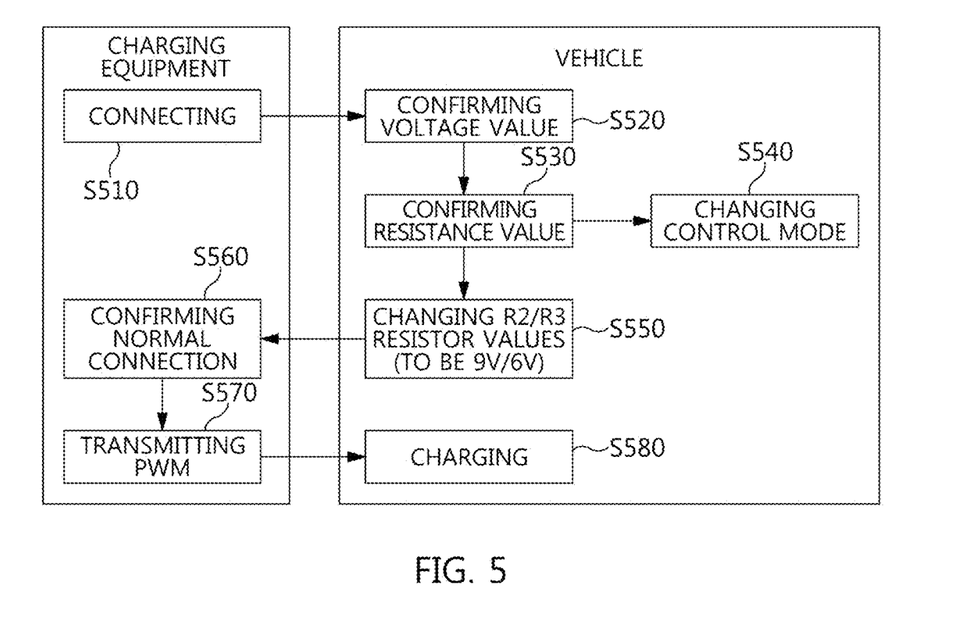
FIG. 5 is a flowchart illustrating a charging connector control procedure according to an embodiment of the present disclosure.

FIG. 5 is a flowchart illustrating a charging connector control procedure according to an embodiment of the present disclosure. Referring to FIG. 5, the first, second, and third variable resistors 415, 425-1, 425-2, can be set, for example, to R1:1 kΩ/R2: 1.3 kΩ/R3:2.74 kΩ, respectively.

In the case that 12V is all applied to the initial 1 kΩ of the first variable resistor R1, the voltage upon measurement is reduced to 9V while the charging connector 10 is connected and the third variable resistor R3 is connected in series (S510, S520 of FIG. 5).

In some embodiments, the voltage supplied by the charging equipment 110 is always the same at 12V, and is reduced to about 9V and 6V by the resistor and sequence of the vehicle 120. For example, it is possible to always keep 12V by changing the resistor according to the type of the charging equipment 110.

If the resistor of the charging equipment 110 is 2 kΩ, a voltage value at the time of the first connection will be sensed at about 6.3V rather than 9V (S530 of FIG. 5).

If 6V is sensed (e.g., by the measuring circuit 413) as soon as the charging equipment 110 is connected to the vehicle 120 when the second variable resistor R2 (or 425-1) is not being used, that is, in a non-operation state of the second switch 422, the vehicle 120 may determine that it is abnormal, and the charging can be terminated.

However, an embodiment of the present disclosure changes the resistance value of the second and/or third variable resistors R2, R3 so that the corresponding voltage can be outputted to be the same as the existing sequence by attaching the variable resistor for rising 6V to 9V (S550 of FIG. 5).

For example, the resistance value of the second variable resistor R2 is changed so that the charging is finally possible through the normal sequence.

The charging equipment 110 confirms the normal connection state therebetween to generate and transmit the charging start signal PWM (S570 of FIG. 5). When the charging start signal is transmitted and outputted, and the vehicle 120 connects the second switch 422, the voltage drops to 6V. Therefore, the charging starts when the 6V+PWM condition is completed (S580 of FIG. 5).

At S530 of FIG. 5, when the resistance value is confirmed, the control mode is changed (S540 of FIG. 5). It is expressed as a table as follows.

TABLE 1

| Items | | Control mode |
|---|---|---|
| Resistance value | 1 kΩ | Auto mode (basic mode) |
| | 2 kΩ | Unlock mode |
| | ... | ... |
| | 7 kΩ | V2G (smart grid) + Unlock mode |
| | 8 kΩ | V2G (smart grid) + Auto mode |

Meanwhile, when the variable resistor is not operated within a predetermine time (e.g., about 3 seconds), the first resistor R1 of the charging equipment 110 side is changed to 1 kΩ to proceed the charging with the Auto mode.

In addition, the resistor of the charging equipment 110 can be changed, but the vehicle 120 can also perform the following method in the event that the charging is impossible because the corresponding control logic is not applied thereto.

Basically, in an embodiment of the present disclosure, the resistance of the charging connector 10 can vary (e.g., having a resistance of about 2 kΩ if the charging equipment is public). However, charging can fail if the resistance of the charging equipment is 2 kΩ but the internal resistance cannot be changed.

In this case, when there is no operation of changing an internal switch S2 of the vehicle 120 within 3 seconds (changeable) from the vehicle after the connection of the charging connector 10, it is determined that there is no operation of controlling the variable resistor and the corresponding resistor in the vehicle 120 and the internal resistor of the charging connector is changed to 1 kΩ so that the Auto mode that is the basic mode is used and the charging enters normally. In this case, it is locked only during charging and is unlocked after charging.

However, in this case, the variable resistor is also installed inside the charging connector 10, and this variable resistor is controlled by the charging equipment 110.

Figure 6:
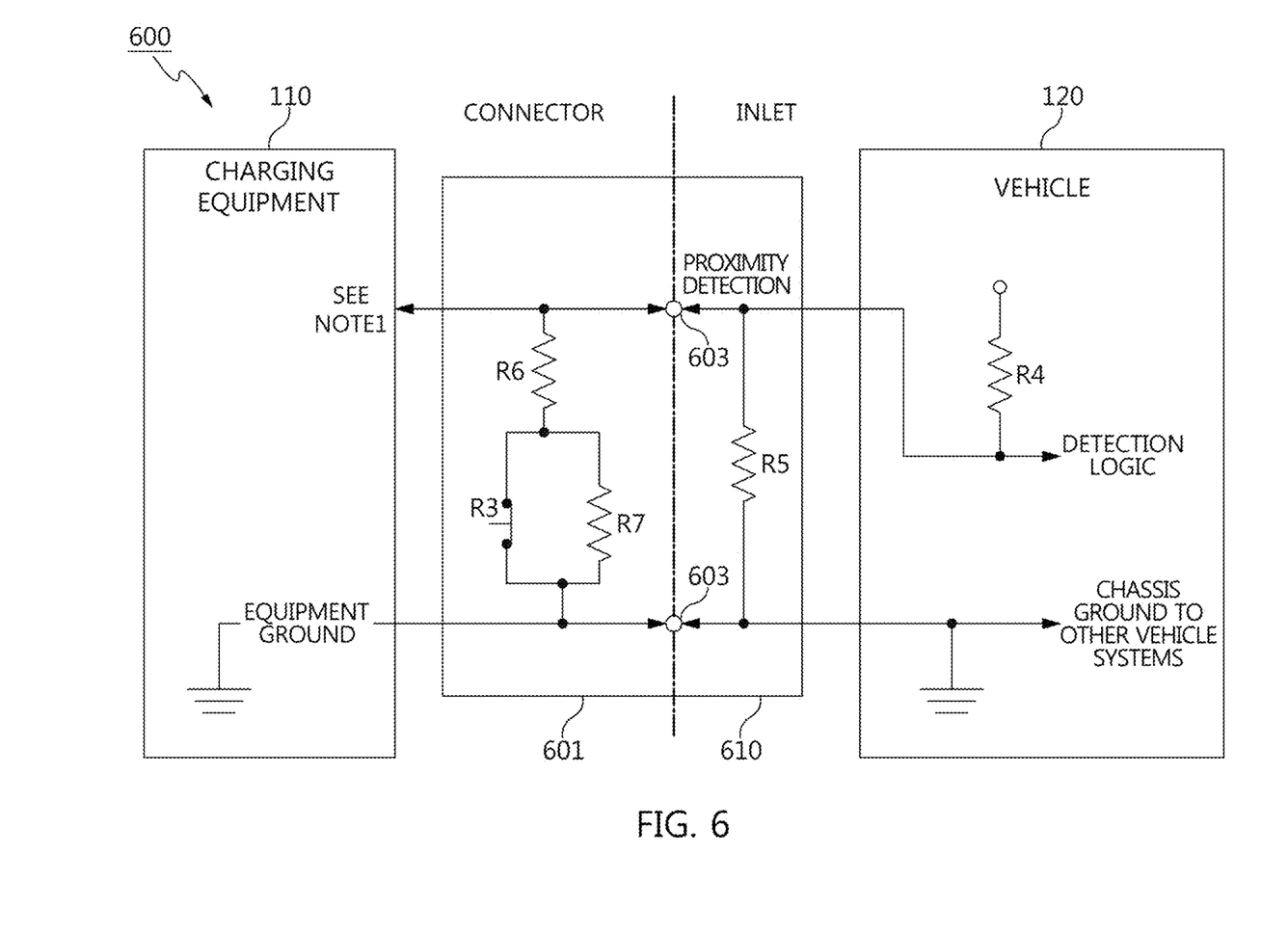
FIG. 6 is a circuit block diagram of a charging connector control system according to another embodiment of the present disclosure.

FIG. 6 is a circuit block diagram of a charging connector control system 600 according to another embodiment of the present disclosure. Referring to FIG. 6, a control signal used for charging includes a Power Delivery (PD) signal (see NOTE 1) in addition to the Control Pilot (CP) and the corresponding signal also measures a voltage based on a resistor.

When a charging connector 601 is not connected to an inlet 610, 4.5V is measured by a resistor R4+ a resistor R5. In contrast, when the charging connector 601 is connected to the inlet 610, R6 and R7 are added to become 1.53V.

When a switch S3 is selected to remove the charging connector 601, 2.77V is measured.

The charging connector 601 is also composed of a plurality of electric wires, and some electric wires 603, 605 are used to transmit the Power Delivery (PD) signal.

However, in an embodiment illustrated in FIG. 6, the voltage is used only for two of whether the charging connector is connected and whether the charging connector is removed, and is not used for the charging control (whether the charging start payment has been completed, etc.). Therefore, only a reference value (e.g., a value according to the standard protocol) used for the charging control of the vehicle 120 is changed, and only the operation for the corresponding reference value is clearly indicated, thereby storing this information in the vehicle control unit.

Therefore, even if the variable resistor of the vehicle is not used, the same control as described above is possible only by changing the resistors R6, R7 of the charging connector 601. For example, it can be, for example, changed to another charging connector having different resistors from each other for each type. In this case, when it does not match with the value stored in the vehicle control unit, the guide information for guiding a change to another charging connector can be outputted. The output can be a combination of characters, graphics, and voices.

For this purpose, a display, a speaker, etc. can be provided therein. The display 150 can be a Liquid Crystal Display (LCD), a Light Emitting Diode (LED) display, an Organic LED (OLED) display, a touch screen, a flexible display, a Head Up Display (HUD), etc.

In addition, the steps of the method or the algorithm explained regarding the embodiments disclosed herein are implemented as a program command format that can be performed through various computers means to be recorded in a computer readable medium. The computer readable medium can include a program (command) code, a data file, a data structure, etc., separately or in a combination thereof.

The program (command) code recorded in the medium can be the ones specially designed or configured for the present disclosure, or can be the one known and available to those skilled in the computer software. Examples of the computer readable medium can include a magnetic media such as a hard disk, a floppy disk, and a magnetic tape, an optical media such as a CD-ROM, a DVD, and a Blue ray, and a semiconductor storage device specially configured to store and perform a program (command) code such as a ROM, a RAM, and a flash memory.

Herein, examples of the program (command) code include a high-level language code that can be executed by a computer using an interpreter, etc., as well as a machine language code made such as those produced by a complier. The hardware device can be configured to operate as one or more software modules in order to perform the operation of the present disclosure, and vice versa.

What is claimed is:

1. A charging connector control system, comprising:
a charging control unit of a charging equipment configured to supply a control signal for charging; and
a vehicle control unit configured to change a sensing control signal to a normal control signal by executing a variable resistor control based on whether the sensing control signal is normal, wherein the sensing control signal is generated by sensing the control signal transmitted through a charging connector configured to connect the charging equipment and a vehicle.

2. The charging connector control system of claim 1, wherein the control signal is changed through a first variable resistor.

3. The charging connector control system of claim 2, wherein a control mode corresponding to the resistance value of the first variable resistor is predetermined, and the control mode is one of an Auto mode that executes the locking of the charging connector only during charging, and a Lock mode that executes the locking of the charging connector regardless of charging.

4. The charging connector control system of claim 3, wherein when the first variable resistor does not operate within a predetermined time, the Auto mode is executed by changing the resistance value.

5. The charging connector control system of claim 2, wherein a third variable resistor and a second variable resistor are connected in parallel with each other at the vehicle side for a variable resistor control.

6. The charging connector control system of claim 5, wherein the first variable resistor and the third variable resistor are connected in series by the charging connector.

7. The charging connector control system of claim 5, wherein a switch for connecting or disconnecting the second variable resistor is disposed between the third variable resistor and the second variable resistor.

8. The charging connector control system of claim 1, wherein the charging control unit generates and transmits a charging start signal when confirming the normal connection state therebetween.

9. A charging connector control system, comprising:
a vehicle control unit; and
a charging control unit of a charging equipment configured to:
supply a control signal for charging to the vehicle control unit through a charging connector, and
change the control signal to a normal control signal by controlling a variable resistor disposed in the charging connector to transmit it to the vehicle control unit;
wherein the variable resistor is controlled by the vehicle control unit of the charging equipment.

10. The charging connector control system of claim 9, wherein the vehicle control unit performs charging by using an Auto mode, and locks the charging connector only during charging and unlocks it after charging.

11. A charging connector control system, comprising:
a charging control unit of a charging equipment configured to supply a control signal for charging; and
a vehicle control unit configured the control signal to a normal control signal according to the connection or the removal of a charging connector for connecting the charging equipment and a vehicle,
wherein the charging connector has a different resistance value for each type of the charging connector.

12. The charging connector control system of claim 11, wherein the vehicle control unit outputs a guide information for guiding a change to another charging connector when it does not match with a pre-stored resistance value with respect to the charging connector.

13. A charging connector control method, comprising:
supplying a control signal for charging by a charging control unit of a charging equipment;
determining, by a vehicle control unit, whether a sensing control signal is normal, wherein the sensing control signal is generated by sensing the control signal transmitted through a charging connector configured to connect the charging equipment and a vehicle; and
changing, by the vehicle control unit, the sensing control signal to a normal control signal by executing a variable resistor control based on the determination.

14. The charging connector control method of claim 13, wherein the control signal is changed through a first variable resistor.

15. The charging connector control method of claim 14, wherein a control mode corresponding to the resistance value of the first variable resistor is predetermined, and the control mode is one of an Auto mode that executes the locking of the charging connector only during charging, and a Lock mode that executes the locking of the charging connector regardless of charging.

16. The charging connector control method of claim 15, wherein when the first variable resistor does not operate within a predetermined time, the Auto mode is executed by changing the resistance value.

17. The charging connector control method of claim 14, wherein a third variable resistor and a second variable resistor are connected in parallel with each other at the vehicle side for a variable resistor control.

18. The charging connector control method of claim 17, wherein the first variable resistor and the third variable resistor are connected in series by the charging connector.

19. The charging connector control method of claim 17, wherein a switch for connecting or disconnecting the second variable resistor is disposed between the third variable resistor and the second variable resistor.

20. The charging connector control method of claim 13, wherein the charging control unit generates and transmits a charging start signal when confirming the normal connection state therebetween.

* * * * *